US012715413B2

(12) United States Patent
Shigeta

(10) Patent No.: US 12,715,413 B2
(45) Date of Patent: Aug. 25, 2026

(54) DISC BRAKE AND PLANETARY GEAR SPEED REDUCTION MECHANISM

(71) Applicant: Hitachi Astemo, Ltd., Hitachinaka (JP)

(72) Inventor: Hiroshi Shigeta, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 399 days.

(21) Appl. No.: 18/281,621

(22) PCT Filed: Oct. 15, 2021

(86) PCT No.: PCT/JP2021/038256
§ 371 (c)(1),
(2) Date: Sep. 12, 2023

(87) PCT Pub. No.: WO2023/062824
PCT Pub. Date: Apr. 20, 2023

(65) Prior Publication Data

US 2024/0157924 A1 May 16, 2024

(51) Int. Cl.
*B60T 13/74* (2006.01)
*F16D 55/2265* (2006.01)
(Continued)

(52) U.S. Cl.
CPC ........ *B60T 13/746* (2013.01); *F16D 55/2265* (2013.01); *F16D 65/0068* (2013.01);
(Continued)

(58) Field of Classification Search
CPC ............... B60T 13/746; F16D 55/2265; F16D 65/0068; F16D 65/18; F16D 2125/50; F16H 1/28; F16H 57/08
See application file for complete search history.

(56) References Cited

U.S. PATENT DOCUMENTS 11,453,374 B2 * 9/2022 Mitsugi ................ F16D 55/224
12,036,961 B2 * 7/2024 Lim ........................ F16D 65/18
(Continued)

FOREIGN PATENT DOCUMENTS

JP 2020-8134 1/2020
KR 10-2011-0026115 3/2011
(Continued)

OTHER PUBLICATIONS

Office Action issued Nov. 30, 2024 in corresponding Korean Patent Application No. 10-2023-7029020, with machine translation.
(Continued)

*Primary Examiner* — Thomas W Irvin
(74) *Attorney, Agent, or Firm* — Wenderoth, Lind & Ponack, L.L.P.

(57) ABSTRACT

A disc brake includes a planetary gear speed reduction mechanism. A first sun gear of the planetary gear speed reduction mechanism in the disc brake includes a cylindrical supporting portion configured to rotatably support a second sun gear, an annular wall portion facing another gear at a distance away in an axial direction of the other gear, and a reaction force receiving portion disposed to overlap with the other gear as viewed from a radial direction of the other gear and configured to receive a reaction force produced by rotation of the second sun gear.

11 Claims, 6 Drawing Sheets

(51) Int. Cl.

| | |
|---|---|
| ***F16D 65/00*** | (2006.01) |
| ***F16D 65/18*** | (2006.01) |
| *F16D 55/00* | (2006.01) |
| *F16D 121/24* | (2012.01) |
| *F16D 125/50* | (2012.01) |

(52) U.S. Cl.

CPC ...... *F16D 65/18* (2013.01); *F16D 2055/0016* (2013.01); *F16D 2121/24* (2013.01); *F16D 2125/50* (2013.01); *F16D 2250/0076* (2013.01)

(56) References Cited

U.S. PATENT DOCUMENTS

| | | | | |
|---|---|---|---|---|
| 12,139,116 | B2 * | 11/2024 | Shigeta | B60T 1/065 |
| 12,233,828 | B2 * | 2/2025 | Lim | F16D 65/18 |
| 2021/0039620 | A1 * | 2/2021 | Mitsugi | F16D 65/183 |
| 2022/0169226 | A1 * | 6/2022 | Lim | B60T 13/741 |
| 2022/0185256 | A1 * | 6/2022 | Lim | F16D 65/18 |
| 2022/0281430 | A1 * | 9/2022 | Shigeta | F16H 1/06 |
| 2022/0307562 | A1 | 9/2022 | Yoshizu | |

FOREIGN PATENT DOCUMENTS

| | | | | |
|---|---|---|---|---|
| WO | 2019/198509 | | 10/2019 | |
| WO | WO-2019198272 | A1 * | 10/2019 | F16H 57/08 |
| WO | 2020/217788 | | 10/2020 | |

OTHER PUBLICATIONS

International Search Report issued Dec. 7, 2021 in International Application No. PCT/JP2021/038256, with English translation.

Written Opinion of the International Searching Authority issued Dec. 7, 2021 in International Application No. PCT/JP2021/038256, with English translation.

* cited by examiner

THE OTHER END SIDE ← → ONE END SIDE

DISC BRAKE AND PLANETARY GEAR SPEED REDUCTION MECHANISM

TECHNICAL FIELD

The invention relates to a disc brake used for braking a vehicle, and a s car speed reduction mechanism provided in the disc brake.

BACKGROUND ART

For example, the disc brake disclosed in WO 2019/198509 comprises a pair of pads disposed on both axial sides of a rotor so that the rotor is sandwiched therebetween, a piston that pushes one of the pair of pads against the rotor, a caliper body including a cylinder in which the piston is movably accommodated, a motor provided in the caliper body, a planetary gear speed reduction mechanism that boosts and transmits the rotation of the motor, and a piston propulsion mechanism that propels the piston to a braking position using the rotation transmitted from the planetary gear reduction mechanism.

The planetary gear speed mechanism comprises a sun gear including an input gear portion meshed with a spur gear to which the rotation from the motor is transmitted and an output gear portion axially extending from a radial center portion of the input gear portion; a planetary gear meshed with the output gear portion of the sun gear and comprising a plurality of planetary gears spaced apart in a circumferential direction around the output gear portion; and an internal gear disposed around the planetary gears so that internal teeth are meshed with each of the planetary gears.

The sun gear is rotatably supported by a cylindrical supporting portion of the internal gear. The internal gear is provided with protruding portions at an outer peripheral surface of a cylindrical engaging portion thereof. The protruding portions are engaged with engaging grooves provided in a housing so that the internal gear is supported so as not to make a relative rotation to the housing. One end opening of the housing is closed by a cover member. The planetary gear speed reduction mechanism is disposed between the housing and the cover member in a sandwiched manner, to thereby regulate the axial motion of the sun gear. There is a small space between the sun gear and the cover member to allow the rotation of the sun gear.

SUMMARY OF INVENTION

Technical Problem

The disc brake disclosed in WO 2019/198509 is configured such that, when the rotation torque from the motor is inputted into the spur gear, the position of load which the input gear portion of the sun gear receives from the spur gear and the positions at which the protruding portions of the internal gear receive reaction forces from the engaging grooves of the housing are offset in the axial direction of the sun gear (internal gear). This may generate a moment with respect to the sun gear and the internal gear which acts in the direction rotating around a freely-selected straight line along a radial direction of the sun gear and the internal gear. Since there is the small space between the sun gear and the cover member, there is a possibility that the sun gear and the internal gear get inclined in the aforementioned rotating direction by an amount corresponding to the space to aggravate a meshing condition of the planetary gear speed reduction mechanism and the like. If the meshing condition of the planetary gear speed reduction mechanism and the like is aggravated, that is, if gear tooth surfaces unevenly contact one another, there are negative influences on performance, strength, operation noises or the like associated with the transmission of rotation torque.

In light of the aforementioned problem, the invention is directed to provide a planetary gear speed reduction mechanism that improves a meshing condition of gears during activation, and a disc brake provided with the planetary gear speed reduction mechanism.

Solution to Problem

As means for solving the aforementioned issue, the disc brake according to the invention comprises a mounting member that is fixed to a non-rotational portion of a vehicle and provided to straddle an outer peripheral side of a disc rotor; a first friction pad that is movably provided in the mounting member and disposed to face one surface of the disc rotor in an axial direction; a second friction pad that is movably provided in the mounting member and disposed to face the other surface of the disc rotor in the axial direction; a piston configured to push the first friction pad; a caliper configured to accommodate the piston in such a manner that the piston is movable in the axial direction of the disc rotor; a housing provided in the caliper; a motor accommodated in the housing; a planetary gear speed reduction mechanism accommodated in the housing and configured to transmit rotation from the motor; a piston propulsion mechanism configured to convert a rotational force transmitted from the planetary gear speed reduction mechanism into a propulsion force of the piston; and a cover housing mounted on the housing so as to cover an opening of the housing. The planetary gear speed reduction mechanism comprises a sun gear including a first gear to which the rotation from the motor is transmitted and a second gear extending from an axial center portion of the first gear in an axial direction of the first gear; a plurality of planetary gears meshed with the second gear and disposed around the second gear; and an internal gear meshed with the plurality of planetary gears and disposed around the plurality of planetary gears. The internal gear includes a supporting portion configured to rotatably support the sun gear; a flat surface portion disposed to face the first gear at predetermined distance away in the axial direction of the first gear; and a reaction force receiving portion disposed to overlap with the first gear as viewed from a radial direction of the first gear and configured to receive a reaction force produced by rotation of the sun gear.

The planetary gear speed reduction mechanism according to the invention is a planetary gear speed reduction mechanism comprising a sun gear including a first gear to which the rotation from the motor is transmitted and a second gear extending from an axial center portion of the first gear in an axial direction of the first gear; a plurality of planetary gears meshed with the second gear and disposed around the second gear; and an internal gear meshed with the plurality of planetary gears and disposed around the plurality of planetary gears. The internal gear includes a supporting portion configured to rotatably support the sun gear; a flat surface portion disposed to face the first gear at predetermined distance away in the axial direction of the first gear; and a reaction force receiving portion disposed to overlap with the first gear as viewed in a radial direction of the first gear and configured to receive a reaction force produced by rotation of the sun gear.

Advantageous Effects of Invention

The disc brake and the planetary gear speed reduction mechanism according to the invention can improve a meshing condition between gears during activation and thus can repress negative influences on performance, strength, operation noises or the like of the gears.

DESCRIPTION OF EMBODIMENTS

An embodiment of the invention will be discussed below in detail with reference to FIGS. 1 to 6. In the following discussion, a vehicle's interior side (inner side) and exterior side (outer side) are referred to as one end side (cover housing 29 side) and the other end side (disc rotor D side), respectively. In other words, in FIGS. 2, 3, 5 and 6, the right side is referred to as one end side, and the left side is referred to as the other end side.

Figure 1:
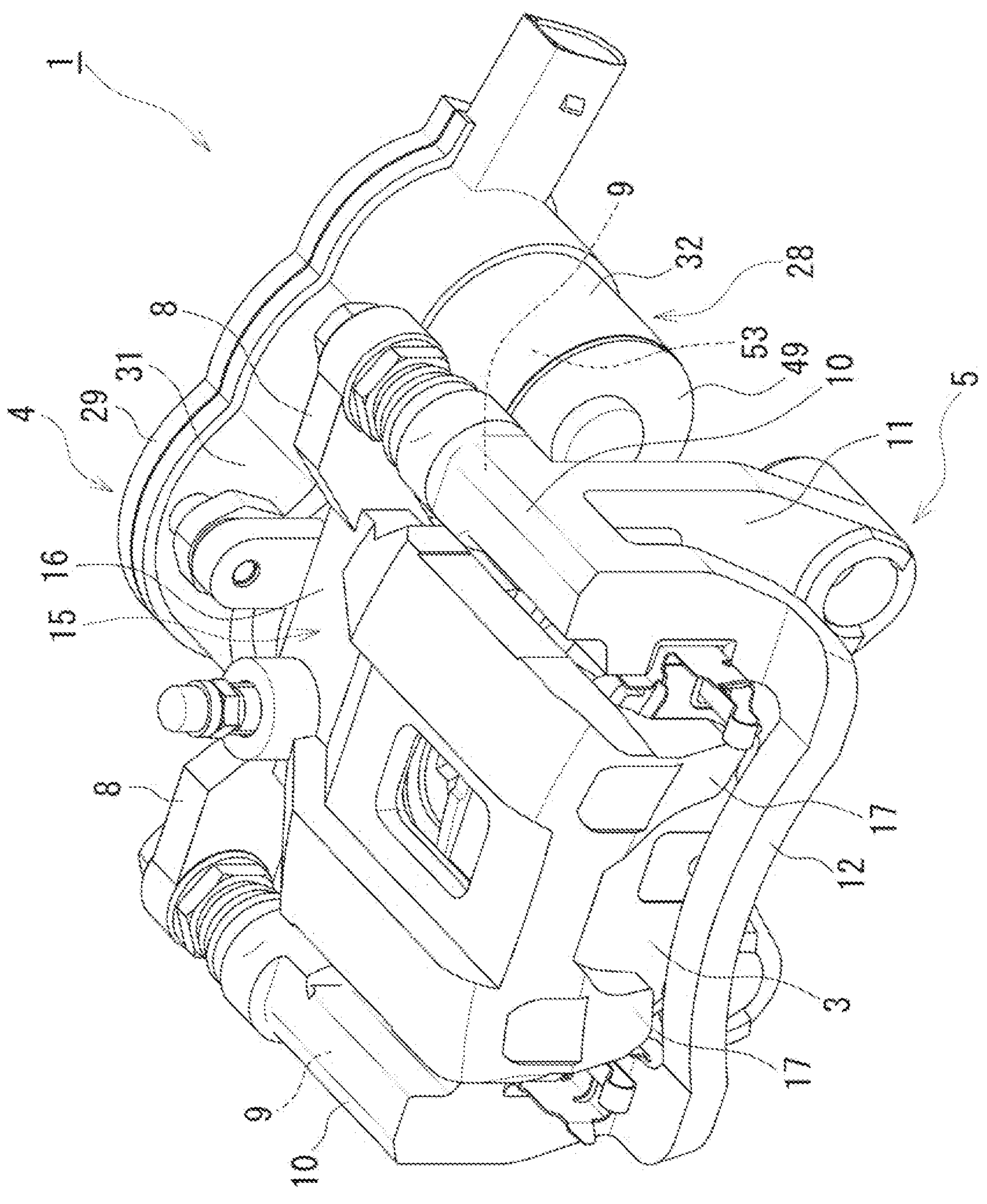
FIG. 1 is a perspective view of a disc brake according to an embodiment of the invention.
Figure 2:
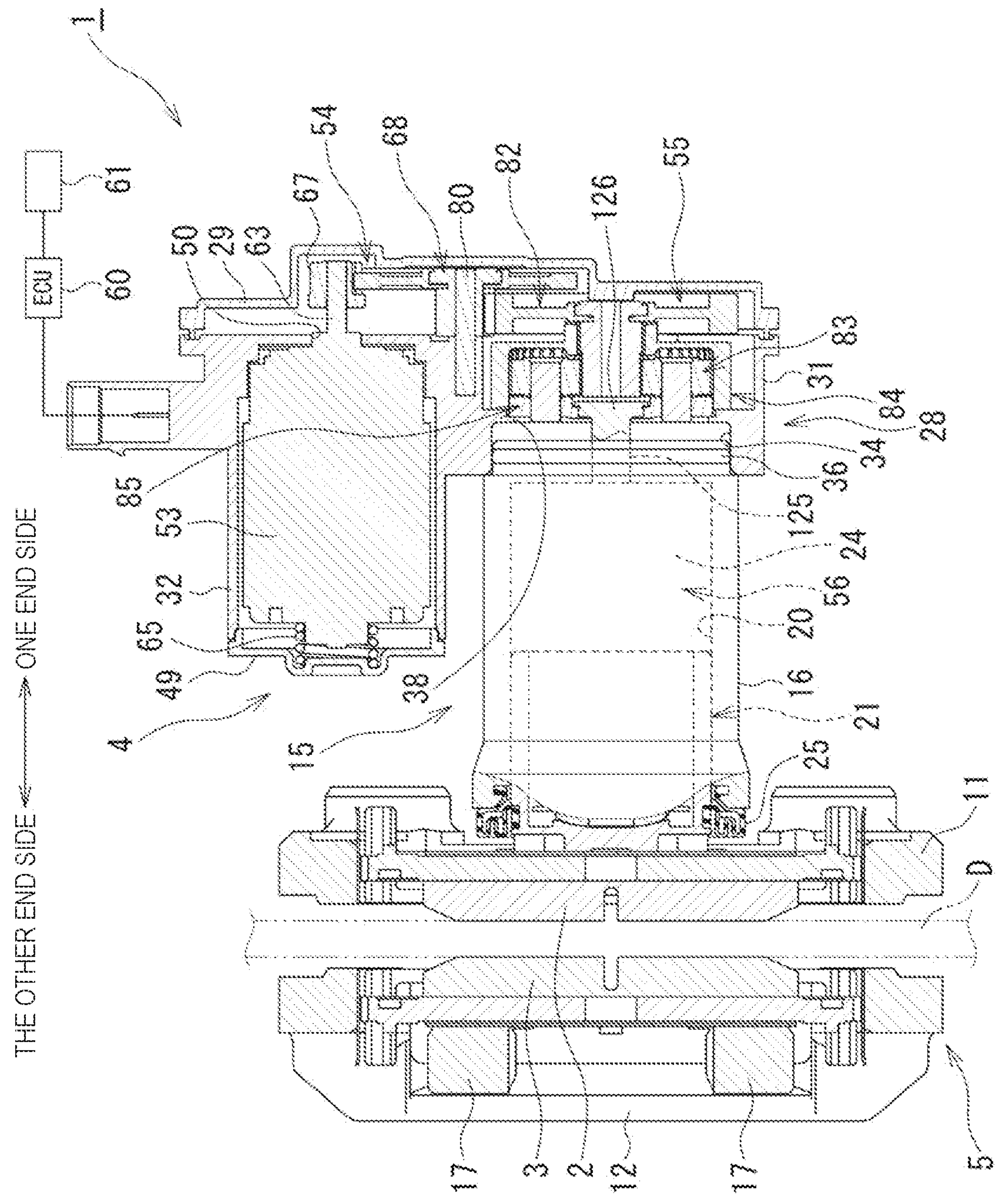
FIG. 2 is a cross-sectional view of the disc brake according to the embodiment of the invention.

A disc brake 1 according to the embodiment, as illustrated in FIGS. 1 and 2, comprises a pair of an inner brake pad 2 and an outer brake pad 3 disposed on both axial sides of the disc rotor D to sandwich the disc rotor D that is mounted on a rotational portion of a vehicle, and a caliper 4. The disc brake 1 is configured as a caliper floating-type. The pair of the inner brake pad 2 and the outer brake pad 3 and the caliper 4 are supported by a bracket 5 to be movable in an axial direction of the disc rotor D. The bracket 5 is fixed to a non-rotational portion, such as a knuckle, of the vehicle and provided to straddle an outer peripheral side of the disc rotor D.

As illustrated in FIGS. 1 and 2, the bracket 5 roughly comprises slide pins 9, 9 fixed to a pair of caliper arm portions 8, 8, respectively, outwardly extending from a cylinder portion 16 discussed later; a pair of pin inserting portions 10, 10 in which the slide pins 9, 9 are inserted to be axially slidable, the pair of pin inserting portions 10, 10 extending to straddle the outer peripheral side of the disc rotor D; an inner side supporting portion 11 integrally connected to the pair of pin inserting portions 10, 10 and configured to support the inner brake pad 2 so that the inner brake pad 2 is movable in the axial direction of the disc rotor D; and an outer side supporting portion 12 integrally connected to the pair of pin inserting portions 10, 10 and configured to support the outer brake pad 3 so that the outer brake pad 3 is movable in the axial direction of the disc rotor D.

The inner brake pad 2 is disposed to face an axial inner-side surface of the disc rotor D. The outer brake pad 3 is disposed to face an axial outer-side surface of the disc brake D. The inner side supporting portion 11 of the bracket 5 is then fixed to the non-rotational portion of the vehicle. The inner brake pad 2 is a first friction pad, and the outer brake pad 3 is a second friction pad. The bracket 5 is a mounting member.

As illustrated in FIG. 2. a caliper body 15 that is a main body of the caliper 4 comprises a bottomed cylinder-like cylinder portion 16 that is disposed on a proximal end side facing the inner brake pad 2 and opens toward the inner brake pad 2; and a pair of claw portions 17, 17 disposed on a distal end side and extending from the cylinder portion 16 toward the outer side in a position straddling the disc rotor D to face the outer brake pad 3. A piston 21 is accommodated inside the cylinder portion 16 of the caliper body 15, that is, a cylinder bore 20 of the cylinder portion 16 so as not to make a relative rotation to the cylinder portion 16 and yet to be movable in the axial direction. The piston 21 is configured to push the inner brake pad 2 and formed into a cup with a bottom. The piston 21 includes a bottom portion that is accommodated in the cylinder bore 20 of the cylinder portion 16 to face the inner brake pad 2. The piston 21 is supported by rotation-locking engagement between the bottom portion thereof and the inner brake pad 2 so as not to make a relative rotation to the cylinder bore 20, and therefore, the caliper body 15.

A seal member, not shown, is disposed on an inner peripheral surface on the other end side of the cylinder bore 20 of the cylinder portion 16. The piston 21 is accommodated in the cylinder bore 20 to be axially movable in contact with the seal member. Formed between the piston 21 and a bottom surface of the cylinder portion 16 is a hydraulic pressure chamber 24 that is defined by the seal member. The hydraulic pressure chamber 24 is supplied with hydraulic pressure from a hydraulic pressure source, not shown, such as a master cylinder and a hydraulic control unit, through a hydraulic circuit, not shown, provided in the cylinder portion 16. A dust boot 25 is interposed between a bottom portion-side outer peripheral surface of the piston 21 and the other end-side inner peripheral surface of the cylinder bore 20. The seal member and the dust boot 25 prevent foreign matters from entering the cylinder bore 20 of the cylinder portion 16.

Mounted on a bottom portion of the cylinder portion 16 of the caliper body 15 is a housing 28. The housing 28 includes an open part at one end side thereof. The open part is closed by the cover housing 29 in an airtight manner. More specifically, the open part at the one end side of the housing 28 is closed by the cover housing 29 being fixed to the housing 28 through vibration welding. A seal member 36 is provided between a fitting concave portion 34 of the housing 28 and the cylinder portion 16. The seal member 36 maintains airtightness inside the housing 28. The housing 28 comprises a first housing portion 31 that accommodates a planetary gear speed reduction mechanism 55 discussed later so as to cover an outer periphery of the bottom portion of the cylinder portion 16, and a second housing portion 32 that is integrally connected side by side with the first housing portion 31, formed at the other end side in a protruding manner to have a bottomed cylinder-like shape, and configured to accommodate an electric motor 53 discussed later.

Figure 3:
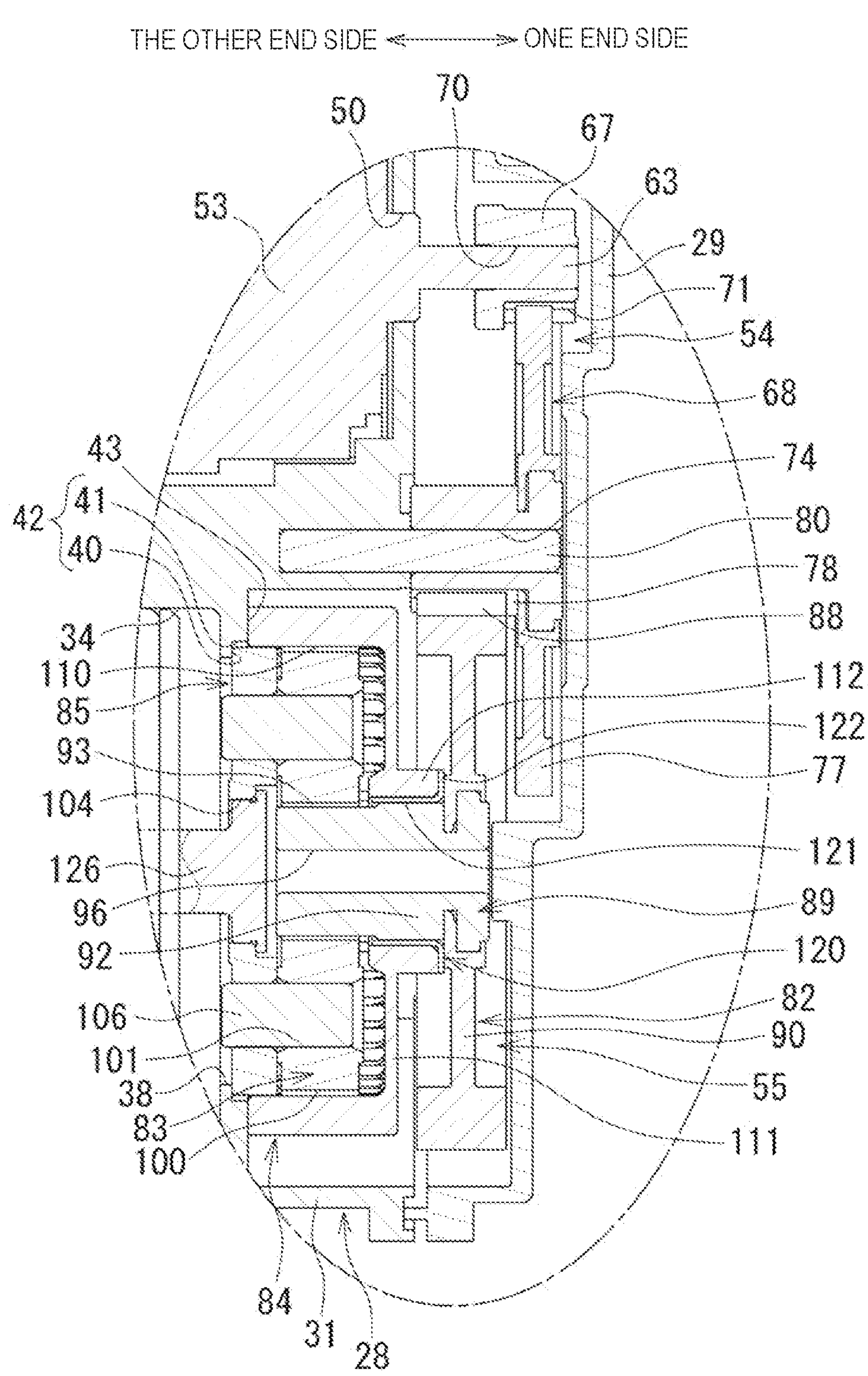
FIG. 3 is an enlarged view of a main part of FIG. 2.

As illustrated in FIGS. 2 and 3, the first housing portion 31 is formed to have a substantially cylindrical shape which is open at the one end side and includes an opening portion 38 at the other end side. As already mentioned, the planetary gear speed reduction mechanism 55 is accommodated inside the first housing portion 31. The fitting concave portion 34 is formed at the other end side of the first housing portion 31. The bottom portion of the cylinder portion 16 is air tightly filled in the fitting concave portion 34 by using the seal member 36. The opening portion 38 is formed in a bottom portion of the fitting concave portion 34. Referring to FIG. 3, a stepped portion 42 is formed to extend from the opening portion 38 to the one end side. The stepped portion 42 includes a first annular surface 40 and a circumferential wall surface 41. A second annular surface 43 is firmed on one end side of the stepped portion 42. A carrier 85 of the later-discussed planetary gear speed reduction mechanism 55 is rotatably supported by the first annular surface 40 of the stepped portion 42. The circumferential wall surface 41 of the stepped portion 42 regulates a radial motion of the carrier 85 of the planetary gear speed reduction mechanism 55.

Figure 4:
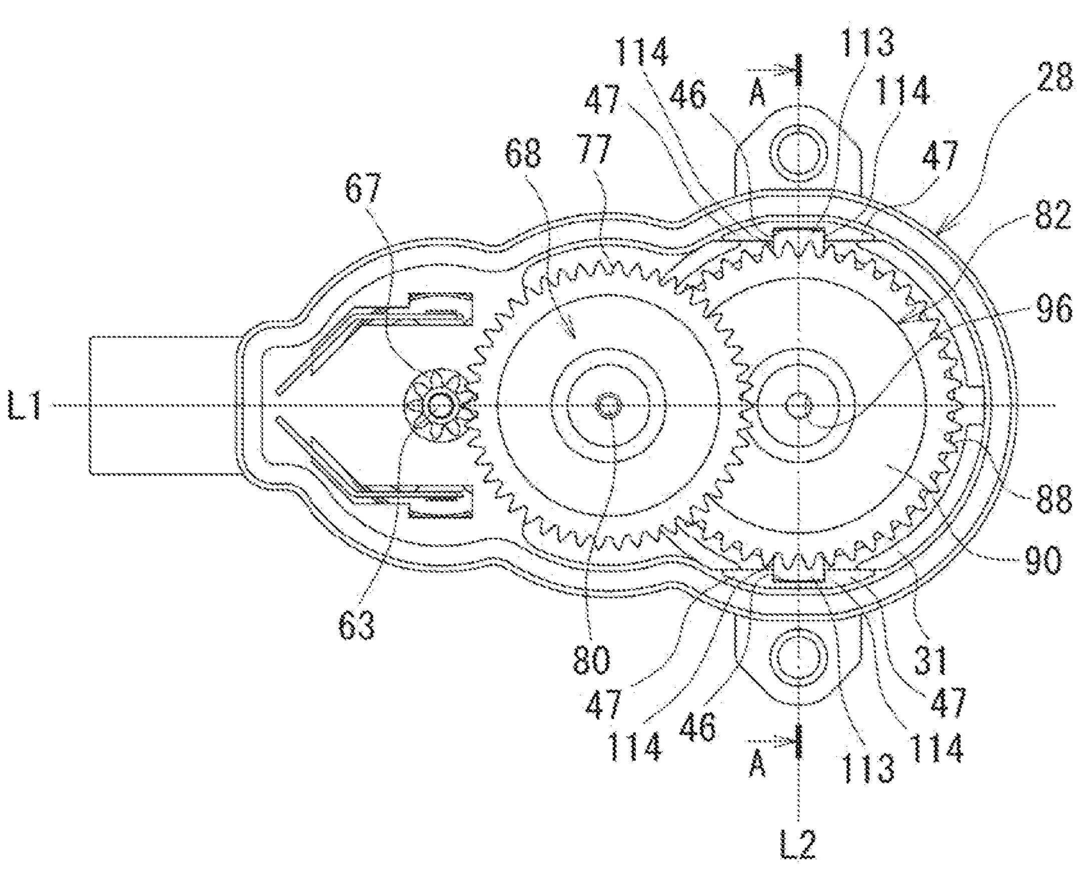
FIG. 4 is a plan view showing the disc brake according to the embodiment of the invention with a cover housing omitted.
Figure 5:
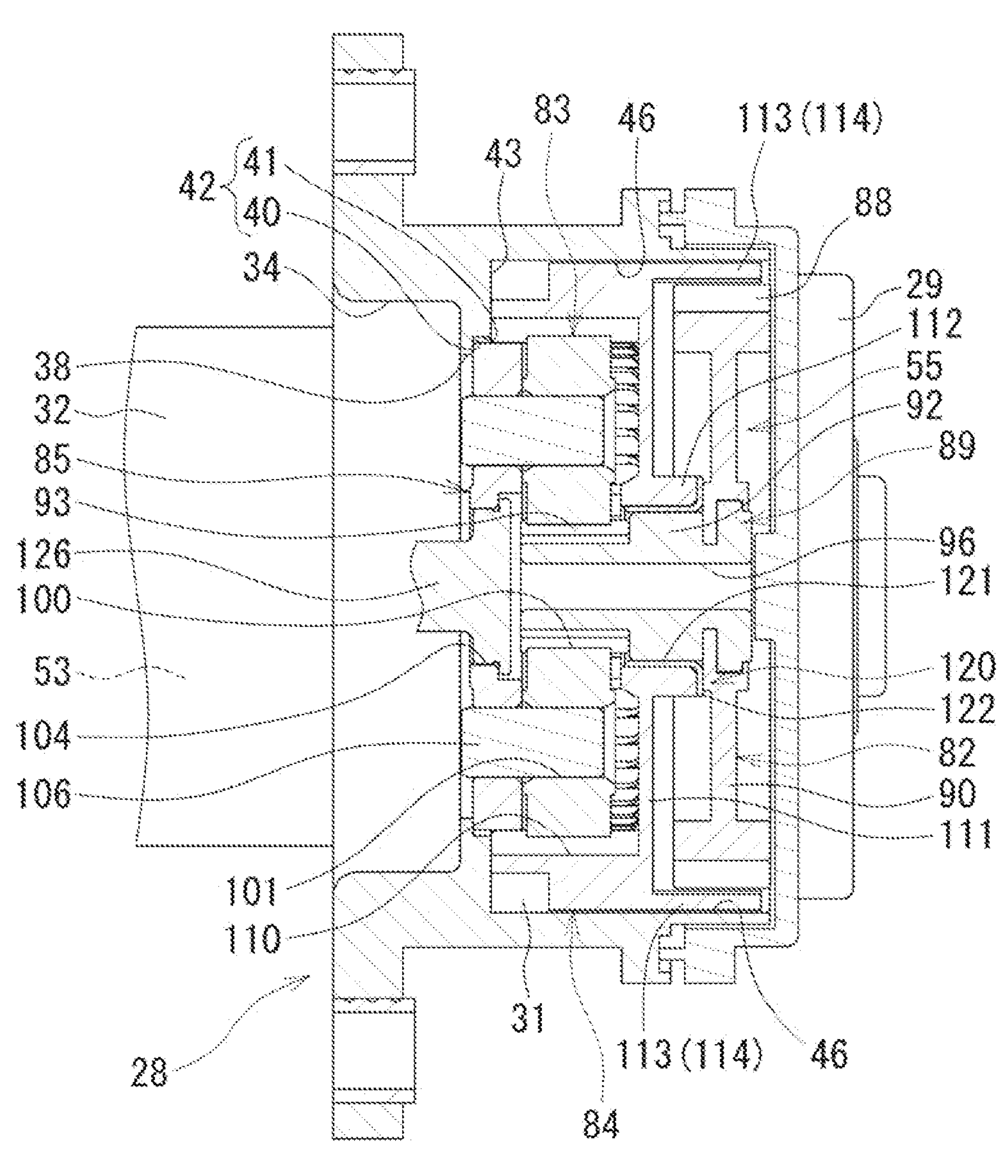
FIG. 5 is a cross-sectional view taken along line A-A of FIG. 4.

Also referring to FIGS. 4 and 5, a pair of engaging concave portions 46, 46 are formed in an inner wall surface of the first housing portion 31 at opposite positions. In other words, the engaging concave portions 46, 46 are formed in the inner wall surface of the first housing portion 31 at a pitch of 180 degrees along a circumferential direction. Each of the engaging concave portions 46, 46 is configured by forming rotation-locking convex portions 47, 47 at two spaced places along the circumferential direction. The rotation-locking convex portions 47, 47 are formed to protrude from the inner wall surface of the first housing portion 31 in a radially inward direction. Referring to FIG. 5, an inner wall portion of the first housing portion 31 within an area where the rotation-locking convex portions 47, 47 (engaging concave portion 46) are formed is formed at the one end side in a protruding manner so as to be fit onto an inner side of a circumferential wall portion of the cover housing 29. Each of the rotation-locking convex portions 47, 47 (engaging concave portion 46) has an axial length corresponding to an axial length of a rotation-locking portion 113 provided in an internal gear 84 discussed later. Referring to FIG. 4, circumferential positions of the engaging concave portions 46, 46 are located on a straight line L2 extending in a direction orthogonal to a straight line L1 connecting a radial center of a speed reduction gear 68 (radial center of a shaft 80) discussed later and a radial center of a sun gear 82 discussed later. Referring to FIG. 2, the second housing portion 32 is formed into a bottomed cylinder with the other end side open. The other end opening of the second housing portion 32 is closed by a cap member 49. A through-hole 50 is firmed in a bottom portion (one end portion) of the second housing portion 32.

As illustrated in FIG. 2, the caliper body 15 comprises the electric motor 53; a spur gear multistage speed reduction mechanism 54 and the planetary gear speed reduction mechanism 55 which boost rotation torque transmitted from the electric motor 53; and a piston propulsion mechanism 56 that converts rotary motion transmitted from the spur gear multistage speed reduction mechanism 54 and the planetary gear speed reduction mechanism 55 into linear motion, imparts a propulsion force to the piston 21, and maintains the propelled piston 21 at a braking position. The electric motor 53 is electrically connected with an electronic control unit (ECU) 60 for controlling the rotation of the electric motor 53. The electronic control unit 60 is electrically connected with a parking switch 61 that is operated to turn on/off the parking brake. The electronic control unit 60 is also capable of activating the parking brake according to a signal transmitted from the vehicle side, instead of operation of the parking switch 61.

The electric motor 53 is accommodated in the second housing portion 32 of the housing 28 as mentioned above. A rotary shaft 63 of the electric motor 53 extends toward the one end side through the through-hole 50 provided in the bottom portion of the second housing portion 32. A spring 65 is disposed between the electric motor 53 and the cap member 49. The electric motor 53 is thus biased by a biasing force of the spring 65 toward the one end side (over housing 29 side). As understood from FIG. 2, the cylinder portion 16 of the caliper body 15 and the electric motor 53 are disposed side by side.

As illustrated in FIGS. 2 and 3, the spur gear multistage speed reduction mechanism 54 is accommodated in the cover housing 29. The spur gear multistage speed reduction mechanism 54 comprises a pinion gear 67 and a speed reduction gear 68. The pinion gear 67 includes a hole portion 70 that is formed to have a cylindrical shape and in which the rotary shaft 63 of the electric motor 53 is fixedly press-fitted, and a gear 71 that is formed at an outer periphery of the pinion gear 67. Formed at a radial center of the speed reduction gear 68 is a shaft hole 74 that extends in the axial direction. The speed reduction gear 68 is configured by integrally connecting a large gear 77 and a small gear 78. The large gear 77 has a large diameter and is meshed with the gear 71 of the pinion gear 67. The small gear 78 has a small diameter and concentrically extends from the large gear 77 in the axial direction. The small gear 78 integrally extends from the large gear 77 toward the other end side. The shaft 80 rotatably extends through the shaft hole 74 of the speed reduction gear 68. The shaft 80 includes the other end that is integrally fixed to a wall portion between the first housing portion 31 and the second housing portion 32 of the housing. The speed reduction gear 68 is thus rotatably supported by the shaft 80. The small gear 78 of the speed reduction gear 68 is meshed with the planetary gear speed reduction mechanism 55.

The planetary gear speed reduction mechanism 55 is accommodated in the first housing portion 31 of the housing 28. The planetary gear speed reduction mechanism 55 comprises the sun gear 82, a plurality of (four, in the present embodiment) planetary gears 83, the internal gear 84, and the carrier 85. The sun gear 82, the internal gear 84, and the carrier 85 are disposed concentrically with one another. The sun gear 82 comprises a large gear 88 with a large diameter which is meshed with the small gear 78 of the speed reduction gear 68, and a small diameter shaft gear 89 with a small diameter which concentrically extends from the large gear 88 in the axial direction. The large gear 88 is integrally provided with a ring-like wall portion 90 that annularly extends on a radially inner side. The small diameter shaft gear 89 integrally extends from a radially inner end portion of the ring-like wall portion 90 of the large gear 88 toward the other end side in a concentric manner. The small diameter shaft gear 89 comprises a large diameter shaft portion 92 located on the one end side and a small gear 93 extending continuously from the large diameter shaft portion 92 toward the other end side in a concentric way. A through-hole 96 is formed in a radial center portion of the small diameter shaft gear 89. The through-hole 96 extends in the axial direction. One end surface of the small diameter shaft gear 89 is disposed very close to the inner wall surface of the cover housing 29. The large diameter shalt portion 92 is larger in diameter than the small gear 93. The large gear 88 of the sun gear 82 is a first gear, and the small gear 93 of the sun gear 82 is a second gear.

Each of the planetary gears 83 includes a gear 100 meshed with the small gear 93 of the sun gear 82 and a pin hole portion 101 through which a pin 106 formed in the carrier 85 in a standing manner rotatably extends. The planetary gears 83 are disposed around the small gear 93 of the sun gear 82 at regular intervals on a circumference of the later-discussed carrier 85. The carrier 85 is formed into a disc. The carrier 85 is rotatably supported by the first annular surface 40 of the stepped portion 42 that is provided in the first housing portion 31. A polygonal hole 104 is formed through a substantially center portion of the carrier 85 in a radial direction. The carrier 85 has an external diameter that is substantially equal to an external diameter of an orbital locus of each of the planetary gears 83. A plurality of pins 106 are formed at an outer peripheral side of the carrier 85 to protrude toward the one end side. The pins 106 are formed in a protruding manner at intervals along a circumferential direction. The pins 106 rotatably extend through the respective pin hole portions 101 of the planetary gears 83. Orbital motion of each of the planetary gears 83 is thus transmitted to the carrier 85. As illustrated in FIGS. 2 and 3, a polygonal shaft portion 126 of a spindle 125 of the piston propulsion mechanism 56 (rotational-linear motion conversion mechanism) discussed later is fitted in the polygonal hole 104 of the carrier 85. This makes it possible to transmit rotation torque between the carrier 85 and the spindle 125.

As illustrated in FIG. 3, the internal gear 84 comprises internal teeth 110 with which the gears 100 of the planetary gears 83 are meshed; a ring-like wall portion 111 extending continuously from one axial end of the internal teeth 110 radially inwards in a concentric manner to have a planar shape; a cylindrical supporting portion 112 extending continuously from a radially inner end portion of the ring-like wall portion 111 toward the one end side in a concentric manner; and a pair of rotation-locking portions 113, 113 (see FIGS. 4 and 5) extending continuously from an outer peripheral surface of a region where the internal teeth 110 are formed through the ring-like wall portion 111 toward the one end side. The ring-like wall portion 111 is disposed to face the large gear 88 of the sun gear 82, or more specifically, the ring-like wall portion 111 of the large gear 88 at predetermined distance away in the axial direction of the sun gear 82. The cylindrical supporting portion 112 is concentrically disposed at radially outside of the large diameter shaft portion 92 that is provided in the small diameter shaft gear 89 of the sun gear 82. A plain bearing 120 is disposed between the cylindrical supporting portion 112 and the large diameter shaft portion 92 of the sun gear 82. The plain bearing 120 comprises a cylindrical bearing portion 121 and an annular flange portion 122 extending from one end of the bearing portion 121 in a radially outward direction. The bearing portion 121 is disposed between an inner peripheral surface of the cylindrical supporting portion 112 of the internal gear 84 and an outer peripheral surface of the large diameter shaft portion 92 of the sun gear 82.

The annular flange portion 122 of the plain bearing 120 is held between one end surface of the cylindrical supporting portion 112 of the internal gear 84 and the other end surface of the ring-like wall portion 90 of the sun gear 82. The plain bearing 120 supports the large diameter shaft portion 92 of the sun gear 82 in a rotatable manner relative to the cylindrical supporting portion 112 of the internal gear 84. Accordingly, the sun gear 82 is rotatably supported relative to the internal gear 84. The cylindrical supporting portion 112 is a supporting portion. The ring-like wall portion 111 is a flat surface portion. As illustrated in FIGS. 4 and 5, the pair of rotation-locking portions 113, 113 is formed in the internal gear 84 to protrude radially outward from the outer peripheral surface of the region where the internal teeth 110 are formed. The pair of rotation-locking portions 113, 113 moreover extends continuously from the ring-like wall portion 111 toward the one end side. The pair of rotation-locking portions 113, 113 is formed at positions corresponding to the pair of engaging concave portions 46, 46 provided in the first housing portion 31, or more specifically, formed at a pitch of 180 degrees along the circumferential direction of the internal gear 84. Since the pair of rotation-locking portions 113, 113 is engaged with the pair of engaging concave portions 46, 46 provided in the first housing portion 31, the pair of rotation-locking portions 113, 113 is disposed at positions on the straight line L2 extending in the direction orthogonal to the straight line L1 connecting the radial center of the speed reduction gear 68 (radial center of the shaft 80) and the radial center of the sun gear 82 with the planetary gear speed reduction mechanism 55 installed in the first housing portion 31.

The rotation-locking portion 113 is formed to have a substantially rectangular cross-section. As mentioned above, the rotation-locking portion 113 is formed to protrude radially outward from the outer peripheral surface of the region where the internal teeth 110 of the internal gear 84 are formed, and extends continuously from the ring-like wall portion 111 of the internal gear 84 toward the one end side. More specifically, referring to FIG. 5, the rotation-locking portion 113 extends from the ring-like wall portion 111 of the internal gear 84 beyond an axial center position of the large gear 88 and further extends to a position of or short of one axial end of the large gear 88. In other words, the rotation-locking portion 113 extends toward the one end side so that one end thereof is located between the axial center position of the large gear 88 and the one axial end of the large gear 88. A portion of the rotation-locking portion 113 which extends from the ring-like wall portion III toward the one end side is disposed to overlap with the large gear 88 as viewed from the radial direction of the large gear 88 of the sun gear 82. The pair of rotation-locking portions 113, 113 of the internal gear 84 is engaged with the engaging concave portions 46, 46 of the first housing portion 31 through clearance fit.

Fit dimension tolerance is so set that there is a small clearance between the rotation-locking portion 113 and each of the rotation-locking convex portions 47, 47 and that there is a small clearance between a top surface of the rotation-locking portion 113 and a bottom surface of the engaging concave portion 46 when the rotation-locking portion 113 of the internal gear 84 is engaged with the engaging concave portion 46 of the first housing 31. The other end surface of the internal gear 84 is brought into abutment against the second annular surface 43 of the first housing portion 31. The pair of rotation-locking portions 113, 113 of the internal gear 84 is engaged with the engaging concave portions 46, 46 of the first housing portion 31. One end surface of the cylindrical supporting portion 112 of the internal gear 84 abuts against the ring-like wall portion 90 of the sun gear 82 with the annular flange portion 122 of the plain bearing 120 interposed therebetween. The internal gear 84 is thus regulated in axial and radial motions and supported so as not to rotate relative to the first housing portion 31.

As understood from FIG. 4, engaging points of the pair of rotation-locking portions 113, 113 of the internal gear 84 and the engaging concave portions 46, 46 of the first housing portion 31 are located on the straight line L2 extending in the direction orthogonal to the straight line L1 connecting the radial center of the speed reduction gear 68 (radial center of the shaft 80) and the radial center of the sun gear 82. As illustrated in FIGS. 4 and 5, abutting portions of the rotation-locking portion 113 of the internal gear 84 against the rotation-locking convex portions 47, 47 provided in the first housing portion 31 function as reaction force receiving portions 114, 114 that receive a reaction force from the first housing portion 31 which is produced by rotation of the sun gear 82.

The piston propulsion mechanism 56 comprises a rotational-linear motion conversion mechanism. As illustrated in FIG. 2, the piston propulsion mechanism 56 converts rotary motion transmitted from the spur gear multistage speed reduction mechanism 54 and the planetary gear speed reduction mechanism 55, that is, rotary motion of the spindle 125 into linear motion, and imparts a propulsion force to the piston 21 by moving a linear motion member, not shown, to thereby propel the piston 21 (move the piston 21 toward the other end side) and maintain the piston 21 at the braking position. The spindle 125 includes a polygonal shaft portion 126 in one end portion thereof. The polygonal shaft portion 126 is fitted in the polygonal hole 104 provided in the carrier 85 of the planetary gear speed reduction mechanism 55. The piston propulsion mechanism 56 is disposed in the cylinder bore 20 to be located between a bottom surface of the cylinder bore 20 and the piston 21. When the spindle 125 rotates along with rotation of the carrier 85, the piston propulsion mechanism 56 causes the linear motion member to advance toward the other end side. The piston 21 therefore also advances to push the inner brake pad 2 against the disc rotor D and thus can maintain the braking state thereof.

Operation of the disc brake 1 according to the present embodiment will be now discussed.

First, the discussion explains the operation during the braking of the disc brake 1 as a normal hydraulic brake which is applied through a brake pedal, not shown.

When the brake pedal is pressed down by driver, hydraulic pressure corresponding to a tread force applied to the brake pedal is supplied from the hydraulic pressure source, such as a master cylinder, not shown, through a hydraulic circuit, not shown, to the hydraulic pressure chamber 24 located in the cylinder portion 16 (cylinder bore 20) of the caliper body 15. The piston 21 then advances (moves to the left in FIG. 2) from an original position, at which the piston 21 is in a non-braking state, while elastically deforming the seal member and presses the inner brake pad 2 against the disc rotor D. The reaction force acting against the pressure onto the inner brake pad 2 which is applied by the piston 21 makes the caliper body 15 move toward the inner side (rightward in FIG. 2) relative to the bracket 5. This causes the claw portions 17, 17 to press the outer brake pad 3 against the disc rotor D. Consequently, the disc rotor D is clamped between the pair of inner and outer brake pads 2, 3, which generates a friction force, and therefore generates a braking force of the vehicle.

When the driver releases the brake pedal, the supply of the hydraulic pressure from the hydraulic pressure source, such as a master cylinder, is stopped, which decreases the hydraulic pressure within the hydraulic pressure chamber 24. The piston 21 is then retreated to the original position by a restoring force of the seal member from elastic deformation, to thereby release the braking force. In this connection, if a displacement amount of the piston 21 is increased due to abrasion of the inner and outer brake pads 2, 3, and the seal member is elastically deformed beyond a limit, sliding occurs between the piston 21 and the seal member. The sliding displaces the original position of the piston 21 relative to the caliper body 15 so that pad clearance is adjusted to be fixed.

The following discussion will explain operation of a parking brake that is an example of operation for maintaining a halting state of the vehicle.

To activate (apply) the parking brake by operating a parking switch 61 when the parking brake is in a released state, a command is issued from the electronic control unit 60 to drive the electric motor 53 in an apply direction and thus rotate the sun gear 82 of the planetary gear speed reduction mechanism 55 through the spur gear multistage speed reduction mechanism 54. In response to the rotation of the sun gear 82, each of the planetary gears 83 orbits the sun gear 82 with an axis of the sun gear 82 at the center while rotating on its axis, to thereby rotate the carrier 85. The rotation from the carrier 85 is transmitted to the spindle 125.

When the rotation from the electric motor 53 is transmitted through the spur gear multistage speed reduction mechanism 54 to the planetary gear speed reduction mechanism 55, the pair of rotation-locking portions 113, 113 provided in the internal gear 84 receives the reaction force from the rotation-locking convex portions 47, 47 of the first housing portion 31 at symmetric positions across the radial center of the internal gear 84, which are positions located on the straight line L2 extending in the direction orthogonal to the straight line L1 connecting the radial center of the speed reduction gear 68 and the radial center of the sun gear 84. Furthermore, the rotation-locking portion 113 (reaction force receiving portion 114) of the internal gear 84 receives the reaction force from the rotation-locking convex portions 47, 47 of the first housing portion 31 at the position overlapping with the large gear 88 of the sun gear 82 as viewed from the radial direction of the large gear 88.

Since the internal gear 84 rotatably supports the sun gear 82 at the cylindrical supporting portion 112 thereof, the load which the large gear 88 of the sun gear 82 receives from the small gear 78 of the speed reduction gear 68 is also supported by the internal gear 84 during the activation of the planetary gear speed reduction mechanism 55. However, a position of the load which the large gear 88 of the sun gear 82 receives from the small gear 78 of the speed reduction gear 68 and a position where the rotation-locking portion 113 (reaction force receiving portion 114) of the internal gear 84 receives the reaction force from the rotation-locking convex portions 47, 47 of the first housing portion 31 are substantially the same positions located along the axial direction of the internal gear 84. This makes it possible to repress the generation of moment rotating relative to the internal gear 84 around a freely-selected straight line along the radial direction of the internal gear 84.

When the spindle 125 rotates in response to the activation of the planetary gear speed reduction mechanism 55, the piston propulsion mechanism 56 is operated to advance the linear motion member thereof to advance the piston 21. The piston 21 advances to push the inner brake pad 2 against the disc rotor D. Due to the reaction force against the pressure applied to the inner brake pad 2 by the piston 21, the caliper body 15 moves relative to the bracket 5 toward the inner side (rightward in FIG. 2) and pushes the outer brake pad 3 against the disc rotor D with the claw portions 17, 17 thereof.

The disc rotor D is then clamped by the pair of inner and outer brake pads 2, 3 to generate the friction force, and therefore generate the braking force of the vehicle, whereby the braking state can be maintained. In the electronic control unit 60, the electric motor 53 is driven until the pressure applied from the pair of inner and outer brake pads 2, 3 to the disc rotor D reaches a predetermined value, for example, until an electric current value of the electric motor 53 reaches a predetermined value. When the electronic control unit 60 detects that the pressure applied to the disc rotor D reaches the predetermined value by the electric current value of the electric motor 53 reaching the predetermined value, the electronic control unit 60 stops supplying power to the electric motor 53.

When braking is released, the rotary shaft 63 of the electric motor 53 rotates in a reverse direction, or releasing direction, according to a command from the electronic control unit 60. At the same time, the reverse rotation is transmitted through the spur gear multistage speed reduction mechanism 54 and the planetary gear speed reduction mechanism 55 to the spindle 125. The piston propulsion mechanism 56 is then operated to retreat the linear motion member of the piston propulsion mechanism 56 into an initial state along with the reverse rotation of the spindle 125. Accordingly, the braking force applied to the disc rotor D by the pair of inner and outer brake pads 2, 3 is released.

Figure 6:
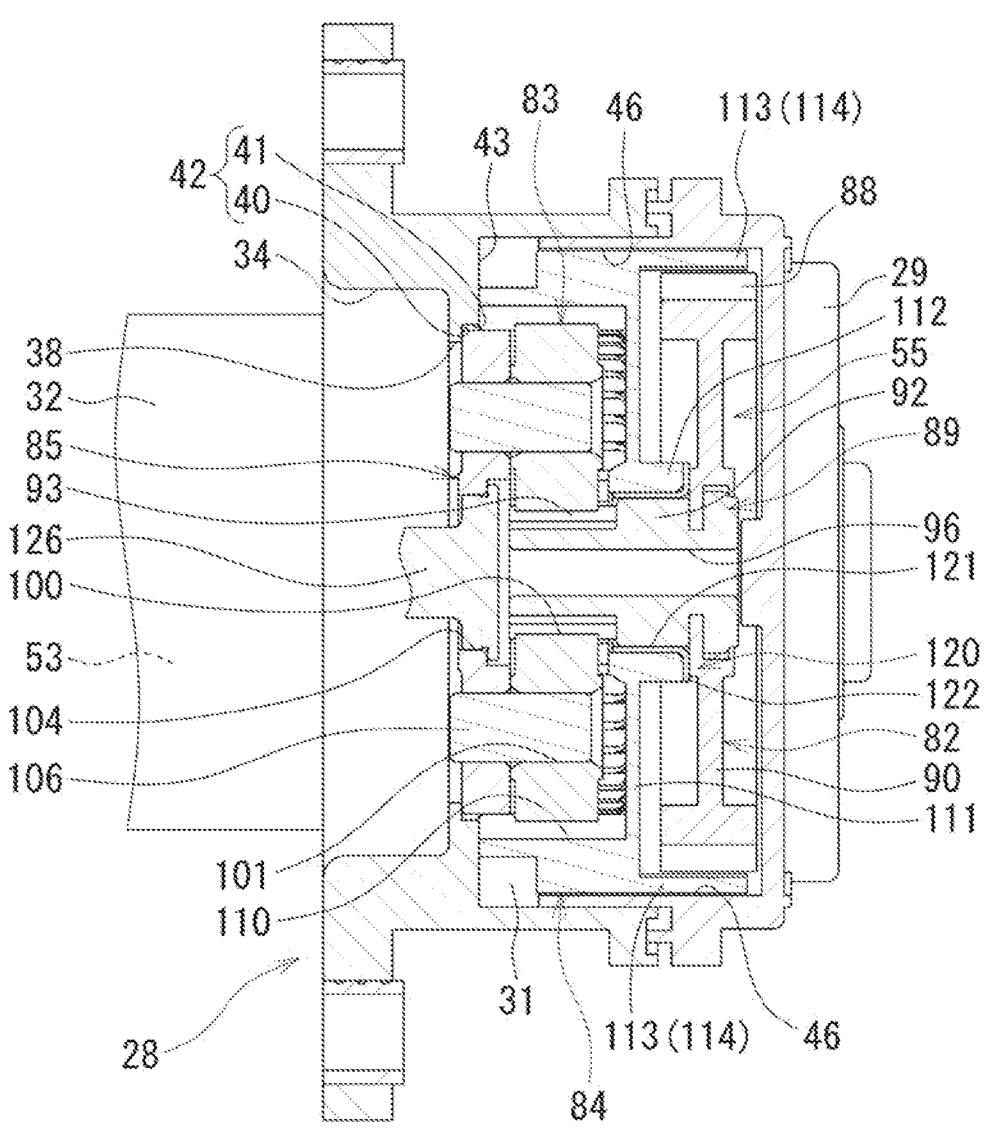
FIG. 6 is a similar cross-sectional view to FIG. 5 which shows a disc brake according to another embodiment.

In the disc brake 1 according to the present embodiment, as illustrated in FIGS. 4 and 5, the engaging concave portion 46 (the pair of rotation-locking convex portions 47, 47), with which the rotation-locking portion 113 provided in the internal gear 84 is engaged, is provided in the inner wall surface of the first housing portion 31 of the housing 28. Instead, as illustrated in FIG. 6, the engaging concave portion 46 (the pair of rotation-locking convex portions 47, 47), with which the rotation-locking portion 113 provided in the internal gear 84 is engaged, may be provided in the inner wall surface of the cover housing 29. In the case of the present embodiment, as understood from FIG. 6, within an area in the cover housing 29 where the rotation-locking convex portions 47, 47 (engaging concave portion 46) are formed, the inner wall portion thereof is formed to protrude toward the other end side to overlap with the inner side of a circumferential wall portion of the first housing portion 31.

As discussed above, in the planetary gear speed reduction mechanism 55 employed in the disc brake 1 according to the present embodiment, the internal gear 84 is provided with the rotation-locking portion 113 including the reaction force receiving portions 114, 114 that receive the reaction force produced by the rotation of the sun gear 82. The rotation-locking portion 113 is disposed to overlap with the large gear 88 of the sun gear 82 as viewed from the radial direction of the large gear 88. Consequently, during the activation of the planetary gear speed reduction mechanism 55, the position of the load which the larger gear 88 of the sun gear 82 receives from the small gear 78 of the speed reduction gear 68 and the position where the rotation-locking portion 113 (reaction force receiving portion 114) of the internal gear 84 receives the reaction force from the rotation-locking convex portions 47, 47 of the first housing portion 31 are substantially the same positions located along the axial direction of the internal gear 84.

This makes it possible to repress the generation of moment acting in a rotating direction relative to the sun gear 82 and the internal gear 84 around a freely-selected straight line extending along the radial direction of the sun gear 82 and the internal gear 84 during the activation of the planetary gear speed reduction mechanism 55. It is also possible to repress inclination of the sun gear 82 and the internal gear 84, which improves the meshing condition of the planetary gear speed reduction mechanism 55. This represses negative influences on performance, strength, operation noises or the like of the planetary gear speed reduction mechanism 55 as a gear and enhances the reliability of the planetary gear speed reduction mechanism 55.

In the disc brake 1 according to the present embodiment, the rotation-locking portion 113 provided in the internal gear 84 extends from the ring-like wall portion 111 of the internal gear 84 beyond the axial center position of the large gear 88 to the position of or short of one axial end of the large gear 88. The portion of the rotation-locking portion 113 which extends from the ring-like wall portion 111 toward the one end side is therefore disposed to axially overlap with the large gear 88 of the sun gear 82 as much as possible as viewed from the radial direction of the large gear 88. This makes it possible to maximally repress the generation of moment acting in the rotating direction around a freely-selected straight line relative to the sun gear 82 and the internal gear 84 along the radial direction of the sun gear 82 and the internal gear 84 during the activation of the planetary gear speed reduction mechanism 55.

Furthermore, in the disc brake 1 according to the present embodiment, the internal gear 84 is so configured that the reaction force receiving portion 114 that receives the reaction force produced by the rotation of the sun gear 82 is provided in the rotation-locking portion 113. Since the reaction force receiving portion 114 is provided in the already-existing rotation-locking portion 113, instead of being newly provided, the disc brake 1 can be simplified in configuration.

Furthermore, in the disc brake 1 according to the present embodiment, the internal gear 84 is so configured that the plurality of (two at a pitch of 180 degrees) rotation-locking portions 113 including the reaction force receiving portions 114, 114 are disposed at regular intervals along the circumferential direction. This makes it possible to substantially evenly distribute the reaction force from the first housing portion or the cover housing 29 which is produced by the rotation of the sun gear 82 to the engaging portions (the rotation-locking portions 113, 113 and the engaging concave portions 46, 46) and enhance durability at the engaging portions.

In the disc brake 1 according to the present embodiment, the rotation-locking portion 113 provided in the internal gear 84 is engaged through clearance fit with the engaging concave portion 46 provided in the first housing portion 31 or the cover housing 29. This makes it possible to facilitate assembly and therefore reduce assembly processes, which leads to manufacturing cost reduction.

In the disc brake 1 according to the present embodiment, the cover housing 29 is fixed to the housing through vibration welding. When this method is employed, the spur gear multistage speed reduction mechanism 54 (speed reduction gear 68) and the planetary, gear speed reduction mechanism 55 cannot be rotatably supported on the cover housing 29 side and have to be rotatably supported on the housing 28 side. In such a case, there is a possibility that a meshing failure occurs particularly in the planetary gear speed reduction mechanism 55. The present embodiment is employed to solve this issue. In other words, the present embodiment makes it possible to repress the occurrence of the meshing failure particularly in the planetary gear speed reduction mechanism 55 even if the spur gear multistage speed reduction mechanism 54 (speed reduction gear 68) and the planetary gear speed reduction mechanism 55 are rotatably supported on the housing 28 side.

In the foregoing explanation, the present embodiment is employed in the disc brake 1 that drives the electric motor 53 to generate the braking force for activating the parking disc brake that is used when the parking brake is applied or in another like situation. The present embodiment, however, may be employed in an electric disc brake that drives the electric motor 53 to generate the braking force when normal braking is carried out.

The planetary gear speed reduction mechanism 55 according to the present embodiment may be applied to not only the above-discussed disc brake 1 but another device that boots and outputs rotation from a motor or the like.

Examples of the disc brake 1 based on the present embodiment discussed above include disc brakes according to the following modes.

A disc brake according to a first mode comprises a mounting member (5) that is fixed to a non-rotational portion of a vehicle and provided to straddle an outer peripheral side of a disc rotor (D); a first friction pad (2) that is movably provided in the mounting member (5) and disposed to face one surface of the disc rotor (D) in an axial direction; a second friction pad (3) that is movably provided in the mounting member (5) and disposed to face the other surface of the disc rotor (D) in the axial direction; a piston (21) configured to push the first friction pad (2); a caliper (4) configured to accommodate the piston (21) in such a manner that the piston (21) is movable in the axial direction of the disc rotor (D); a housing (28) provided in the caliper (4); a motor (53) accommodated in the housing (28); a planetary gear speed reduction mechanism (55) accommodated in the housing (28) and configured to transmit rotation from the motor (53); a piston propulsion mechanism (56) configured to convert a rotational force transmitted from the planetary gear speed reduction mechanism (55) into a propulsion force of the piston (21); and a cover housing (29) mounted on the housing (28) so as to cover an opening of the housing (28). The planetary gear speed reduction mechanism (55) comprises a sun gear (82) including a first gear (88) to which the rotation from the motor (53) is transmitted and a second gear (93) extending from an axial center portion of the first gear (88) in an axial direction of the first gear (88); a plurality of planetary gears (83) meshed with the second gear (93) and disposed around the second gear (93); and an internal gear (84) meshed with the plurality of planetary gears (83) and disposed around the plurality of planetary gears (83). The internal gear (84) includes a supporting portion (112) configured to rotatably support the sun gear (82); a flat surface portion (111) disposed to face the first gear (88) at predetermined distance away in the axial direction of the first gear (88); and a reaction force receiving portion (114) disposed to overlap with the first gear (88) as viewed from a radial direction of the first gear (88) and configured to receive a reaction force produced by rotation of the sun gear (82).

In a second mode according to the first mode, the reaction force receiving portion (114) receives the reaction force from the housing (28).

In a third mode according to the first mode, the reaction fierce receiving portion (114) receives the reaction force from the cover housing (29).

In a fourth mode according to the first mode, the reaction force receiving portion (114) extends from the flat surface portion (111) to a position beyond an axial center position of the first gear (88) as viewed from the radial direction of the first gear (88) to be disposed to overlap with the first gear (88).

In a fifth mode according to the fourth mode, the reaction force receiving portion (114) extends from the flat surface portion (111) beyond the axial center position of the first gear (88) and further extends to a position of or short of an axial end portion of the first gear (88) as viewed from the radial direction of the first gear (88) to be disposed to overlap with the first gear (88).

In a sixth mode according to the first mode, the reaction force receiving portion (114) is provided in a rotation-locking portion (113) that regulates a relative rotation of the internal gear (84) to the housing (28) or the cover housing (29).

In a seventh mode according to the sixth mode, the rotation-locking portion (113) comprises a plurality of rotation-locking portions (113) disposed at regular intervals in a circumferential direction of the internal gear (84).

In an eighth mode according to the sixth mode, the rotation-locking portion (113) is engaged with the housing (28) or the cover housing (29) through clearance fit.

In a ninth mode according to the first mode, the cover housing (29) is fixed to the housing (28) through vibration welding.

The planetary gear speed reduction mechanism 55 comprising the disc brake 1 based on the present embodiment is, for example, a planetary gear speed reduction mechanism (55) according to a 10th mode comprising a sun gear (82) including a first gear (88) to which the rotation from the motor (53) is transmitted and a second gear (93) extending from an axial center portion of the first gear (88) in an axial direction of the first gear (88); a plurality of planetary gears (83) meshed with the second gear (93) and disposed around the second gear (93); and an internal gear (84) meshed with the plurality of planetary gears (83) and disposed around the plurality of planetary gears (83). The internal gear (84) includes a supporting portion (112) configured to rotatable support the sun gear (82); a flat surface portion (111) disposed to face the first gear (88) at predetermined distance away in the axial direction of the first gear (88); and a reaction force receiving portion (114) disposed to overlap with the first gear (88) as viewed from a radial direction of the first gear (88) and configured to receive a reaction force produced by rotation of the sun gear (82).

In an 11th mode according to the 10th mode, the reaction force receiving portion (114) extends from the flat surface portion (111) to a position beyond an axial center position of the first gear (88) as viewed from the radial direction of the first gear (88) to be disposed to overlap with the first gear (88).

In a 12th mode according to the 11th mode, the reaction force receiving portion (114) extends from the flat surface portion (111) beyond the axial center position of the first gear (88) and further extends to a position of or short of an axial end portion of the first gear (88) as viewed from the radial direction of the first gear (88) to be disposed to overlap with the first gear (88).

REFERENCE SIGN LIST

1: Disc brake, 2: Inner brake pad (first friction pad), 3: Outer brake pad (second friction pad). 4: Caliper, 5: Bracket (mounting member), 21: Piston, 28: Housing, 29: Cover housing, 53: Electric motor (motor, drive source), 55: Planetary gear speed reduction mechanism, 56: Piston propulsion mechanism, 88: Large gear (first gear), 93: Small gear (second gear), 82: Sun gear, 83: Planetary gear, 84: Internal gear, 111: Ring-like wall portion (flat surface portion), 112: Cylindrical supporting portion (supporting portion), 113: Rotation-locking portion, 114: Reaction force receiving portion, D: Disc rotor

The invention claimed is:

1. A disc brake comprising:

a mounting member that is configured to be fixed to a non-rotational portion of a vehicle and straddle an outer peripheral side of a disc rotor;

a first friction pad that is movable in the mounting member and configured to face a first surface of the disc rotor in an axial direction;

a second friction pad that is movable in the mounting member and configured to face a second surface of the disc rotor in the axial direction;

a piston configured to push the first friction pad;

a caliper configured to accommodate the piston such that the piston is movable in the axial direction of the disc rotor, a housing in the caliper;

a motor accommodated in the housing;

a planetary gear speed reduction mechanism accommodated in the housing and configured to transmit rotation from the motor;

a piston propulsion mechanism configured to convert a rotational force transmitted from the planetary gear speed reduction mechanism into a propulsion force of the piston; and a cover housing mounted on the housing so as to cover an opening of the housing, wherein:

the planetary gear speed reduction mechanism includes a sun gear including a first gear configured to receive the rotation from the motor, and a second gear extending from an axial center portion of the first gear in an axial direction of the first gear;

a plurality of planetary gears meshed with the second gear and disposed around the second gear; and an internal gear meshed with the plurality of planetary gears and disposed around the plurality of planetary gears; and the internal gear includes a supporting portion configured to rotatably support the sun gear; a flat surface portion facing the first gear at a distance away in the axial direction of the first gear; and a rotation-locking portion including a reaction force receiving portion disposed to overlap with the first gear as viewed from a radial direction of the first gear and configured to receive a reaction force produced by rotation of the sun gear.

2. The disc brake according to claim 1, wherein the reaction force receiving portion is configured to receive the reaction force from the housing.

3. The disc brake according to claim 1, wherein the reaction force receiving portion is configured to receive the reaction force from the cover housing.

4. The disc brake according to claim 1, wherein the reaction force receiving portion extends from the flat surface portion to a position beyond an axial center position of the first gear as viewed from the radial direction of the first gear to be disposed to overlap with the first gear.

5. The disc brake according to claim 4, wherein the reaction force receiving portion extends from the flat surface portion beyond the axial center position of the first gear and further extends to a position of or short of an axial end portion of the first gear as viewed from the radial direction of the first gear to be disposed to overlap with the first gear.

6. The disc brake according to claim 1, wherein the rotation-locking portion is configured to regulate a relative rotation of the internal gear to the housing or the cover housing.

7. The disc brake according to claim 6, wherein the rotation-locking portion comprises a plurality of rotation-locking portions disposed at regular intervals in a circumferential direction of the internal gear.

8. The disc brake according to claim 6, wherein the rotation-locking portion is engaged with the housing or the cover housing through clearance fit.

9. A planetary gear speed reduction mechanism comprising:

a sun gear including a first gear configured to receive rotation from a drive source, and a second gear extending from an axial center portion of the first gear in an axial direction of the first gear;

a plurality of planetary gears meshed with the second gear and disposed around the second gear; and an internal gear meshed with the plurality of planetary gears and disposed around the plurality of planetary gears, wherein the internal gear includes:

a supporting portion configured to rotatably support the sun gear;

a flat surface portion facing the first gear at a distance away in the axial direction of the first gear; and a rotation-locking portion including a reaction force receiving portion disposed to overlap with the first gear as viewed from a radial direction of the first gear and configured to receive a reaction force produced by rotation of the sun gear.

10. The planetary gear speed reduction mechanism according to claim 9, wherein the reaction force receiving portion extends from the flat surface portion to a position beyond an axial center position of the first gear as viewed from the radial direction of the first gear to be disposed to overlap with the first gear.

11. The planetary gear speed reduction mechanism according to claim 10, wherein the reaction force receiving portion extends from the flat surface portion beyond the axial center position of the first gear and further extends to a position of or short of an axial end portion of the first gear as viewed from the radial direction of the first gear to be disposed to overlap with the first gear.

* * * * *